Figure 1:
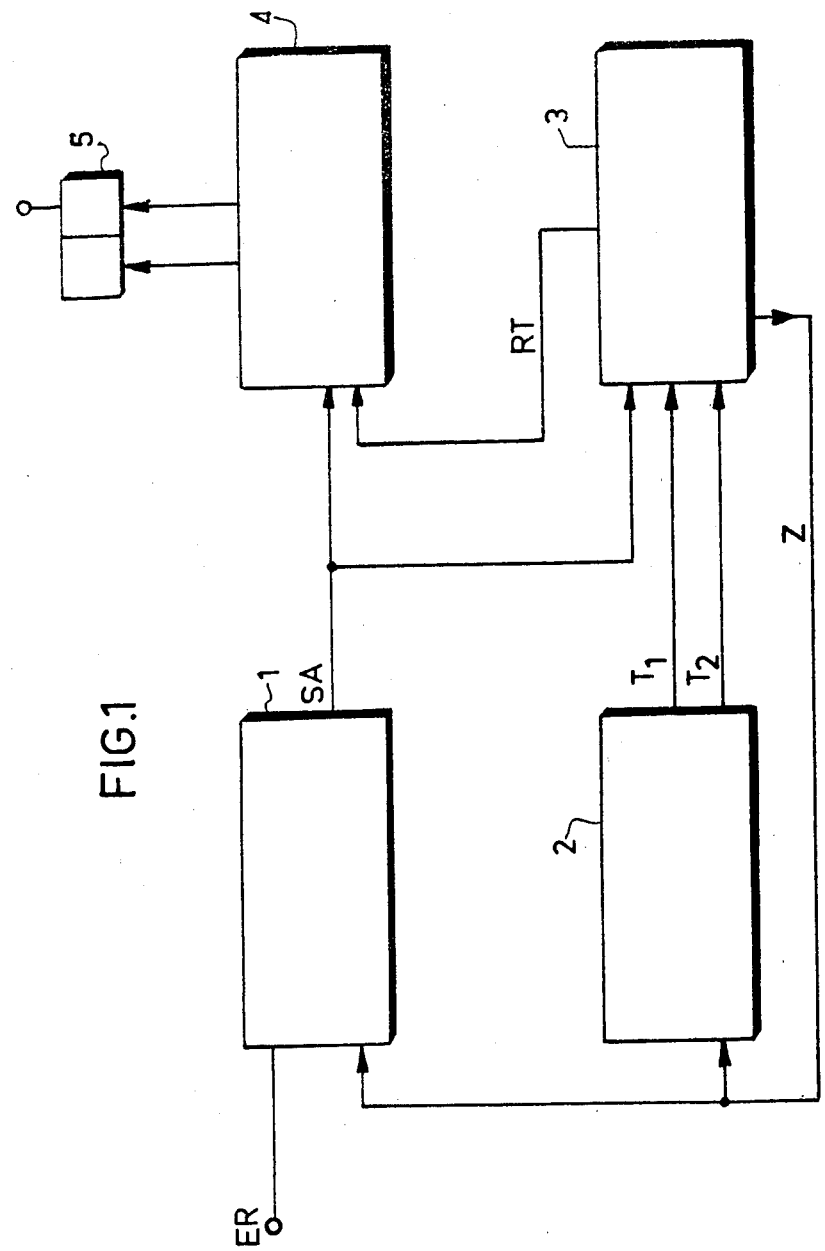

United States Patent [19]

Payen

[11] 4,241,445

[45] Dec. 23, 1980

[54] METHOD AND APPARATUS FOR COUNTING TRANSMISSION ERRORS IN A DIGITAL MICROWAVE LINK

[75] Inventor: Georges A. Payen, Montrouge, France

[73] Assignee: Societe Anonyme de Telecommunications, Paris, France

[21] Appl. No.: 965,866

[22] Filed: Dec. 4, 1978

[30] Foreign Application Priority Data

Dec. 5, 1977 [FR] France ................................ 77 36604

[51] Int. Cl.³ ....................... H04B 17/00; G06F 11/00
[52] U.S. Cl. ........................................... 371/5; 371/8; 370/16; 455/8
[58] Field of Search ........... 340/146.1 A X, 146.1 BE; 325/41, 42, 56; 179/175.35; 235/92 EC; 371/5, 8; 455/8, 9, 10; 370/16

[56] References Cited

U.S. PATENT DOCUMENTS

| | | | |
|---|---|---|---|
| 3,036,290 | 5/1962 | Zarouni | 340/146.1 A X |
| 3,681,694 | 8/1972 | Sarati | 325/56 |
| 3,790,769 | 2/1974 | Ziegler | 340/146.1 A X |
| 3,829,777 | 8/1974 | Muratati et al. | 340/146.1 A X |
| 3,886,318 | 5/1975 | Charransol et al. | 179/175.3 S |
| 4,080,589 | 3/1978 | Kline | 340/146.1 A X |

*Primary Examiner*—Charles E. Atkinson
*Attorney, Agent, or Firm*—Jacobs & Jacobs

[57] ABSTRACT

A method of counting transmission errors in a digital microwave link with a demand of commutation onto an emergency channel when the quality of the link becomes deficient, wherein the errors are counted during a period t which is always at least equal to a value $t_1$ and at the most equal to a value $t_2$, and which terminates when a fixed number N of errors has been detected, a pulse is stored upon each detection of N errors within a period t, and commutation is requested when $n_1$ pulses have been stored consecutively.

3 Claims, 2 Drawing Figures

METHOD AND APPARATUS FOR COUNTING TRANSMISSION ERRORS IN A DIGITAL MICROWAVE LINK

The present invention is related to a method and apparatus of counting transmission errors in a digital microwave link.

To avoid any risk of interruption in transmission on a microwave link, it is indispensable to permanently analyse the quality of this link, thereby to automatically commutate onto an emergency channel when the quality becomes deficient.

In the case of a digital microwave link, this quality assessment consists in detecting the transmission errors on the binary elements and requesting the commutation onto the emergency channel when the quality falls below a determined threshold.

The quality is usually assessed by measuring the error density. This error density may be determined either by counting the errors which occur during a fixed time interval or by measuring the time taken by detecting a determined number of errors.

However, the error density varies very quickly near the threshold: it is typical to pass from an error rate of $10^{-6}$, still admissible, to an error density of $10^{-3}$, which renders the link unusable, for a variation of the field received on a section of the order of 3 or 4 dB.

On the other hand, the fading phenomena which affect the transmission may develop very quickly, since the fading rate may reach 100 dB per second.

In such extreme conditions, only 30 to 40 ms are available for detecting the fading and for effecting the operations of commutation onto the emergency channel. If for example the first mentioned method were used, a very short counting time $t_o$ would then have to be chosen, of the order of a few milliseconds, but the corresponding value of the threshold would be too low for the most frequent case of the fading developing less quickly.

It is an object of the invention to provide a process of counting errors in a digital microwave link, which does not have the above-mentioned drawback of the known methods and which is therefore of improved flexibility.

According to one aspect of the invention, the errors are each time counted during a period t which is always at least equal to a value $t_1$ and at the most equal to a value $t_2$, and which terminates when a fixed number N of errors has been detected, a pulse is stored upon each detection of N errors within a period t, and commutation is produced when $n_1$ pulses have been stored consecutively.

The counting process thus defined, directed to numbers of errors and not to error densities, is suitable both when the speed of fading is very high and when it is slow.

According to a further aspect of the invention, there is provided an apparatus for counting transmission errors in a digital microwave link, intended to produce a demand of commutation onto an emergency channel when the quality of the link becomes deficient, comprising an error counter producing an error signal after detection of N errors, a time base defining a first time interval $t_1$ and a second time interval $t_2 > t_1$ from one and the same time origin, a register connected to the counter, a means for generating a commutation demand when said register has stored $n_1$ consecutive error signals, and a logic circuit connected to the time base and to the counter for resetting said time base and said counter, and allowing the register to store the output signal of the counter after a period which terminates upon generation of an error signal by the counter, and which at least equal to $t_1$ and at most equal to $t_2$.

Figure 2:
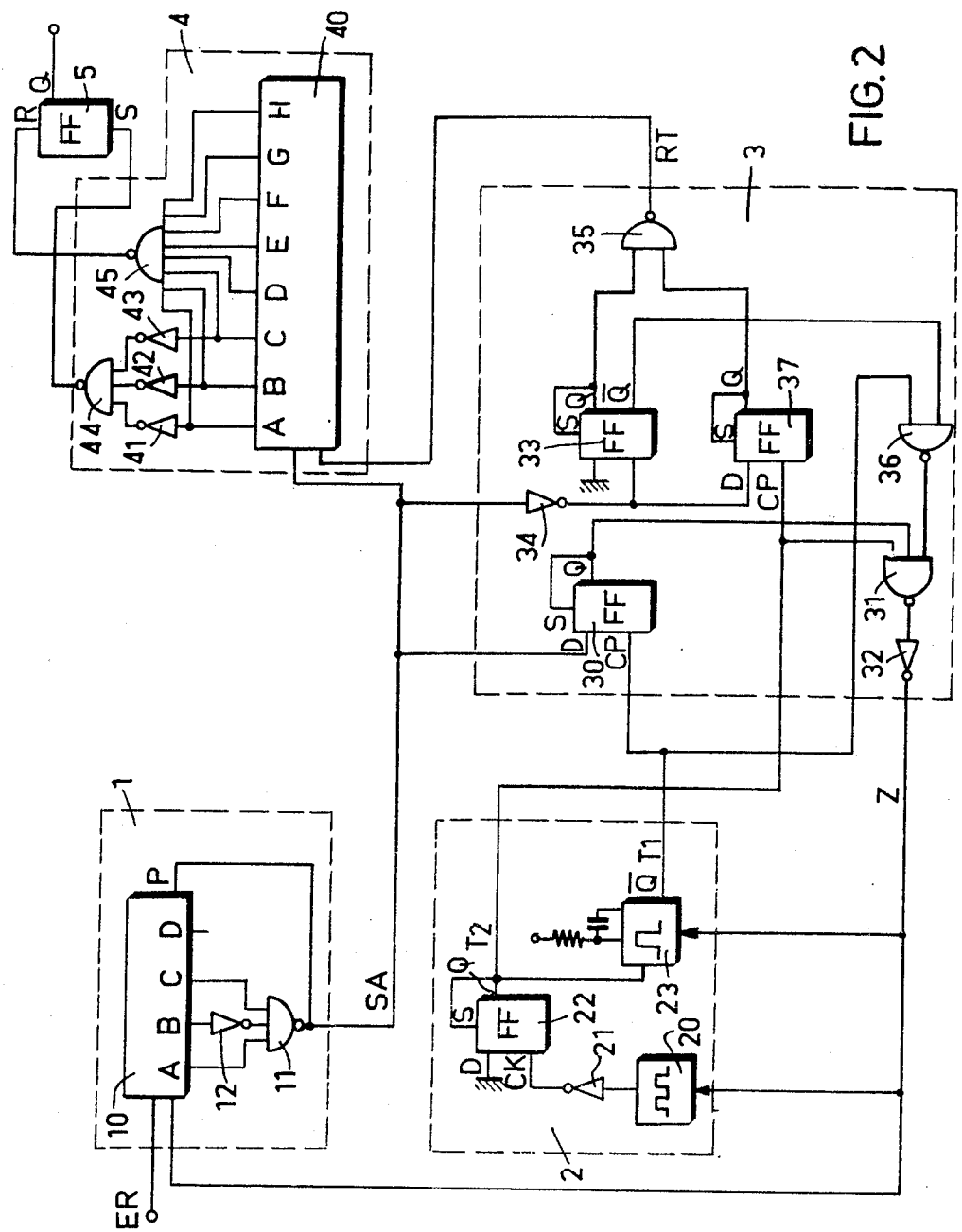

The invention will be more readily understood on reading the following description with reference to the accompanying drawings, in which:

FIG. 1 is a block diagram of an error counting apparatus according to the invention, and FIG. 2 shows a detailed embodiment of the apparatus of FIG. 1.

Referring now to FIG. 1, the apparatus shown comprises an error counter 1 connected to an output terminal ER of an error detector (not shown), a time base 2, a logic circuit 3, a shift register 4 and a flip-flop 5 connected to a commutation device. This apparatus is part of a microwave station and serves to analyse the quality of the digital signal received on a channel. When the quality of the transmission becomes deficient, the flip-flop 5 passes to "1" state and immediately triggers off a request for commutation onto the emergency channel so as to avoid any interruption in transmission.

Counter 1 receives a pulse each time an error is detected on an element of the digital pulse stream. The manner in which error detection is carried out depends in particular on the structure of the digital signal received, and is not critical in the present invention.

Counter 1 generates a pulse SA when it has received N pulses, N being, in the described example, chosen to be equal to 5. The pulse SA is applied to logic circuit 3.

Logic circuit 3 further receives from the time base 2 pulses $T_1$ and $T_2$ at the end of two time intervals $t_1$ and $t_2$, $t_1$ being smaller than $t_2$. $t_1$ and $t_2$, in this example, are 2 ms and 100 ms, respectively. Logic circuit 3 is arranged to derive a signal RT enabling register 4 to store the signal from counter 1 and simultaneously a signal Z for resetting counter 1 and time base 2.

The operating principle is as follows:

When a pulse SA is generated before time interval $t_1$ is lapsed, logic circuit 3 derives signals RT and Z at the time $t_1$.

When a pulse SA is generated at a time t between $t_1$ and $t_2$, logic circuit 3 derives immediately signals RT and Z.

In the third possible case, which is that where the quality of transmission is satisfactory, logic circuit 3 has received no pulse SA when pulse $T_2$ is applied thereto. In this case, logic circuit 3 delivers a signal RT and a pulse Z for resetting counter 1 and time base 2 at the time $t_2$. Register 4, as it receives signal RT, stores the state of the output signal of counter 1, which will be a 1 if pulse SA is a negative one, or vice-versa.

To avoid the triggering of a commutation in case of to phenomena of very short duration, register 4 sends a pulse to flip-flop 5 only when it has stored a number $n_1$ of consecutive pulses SA. This number $n_1$ is chosen to be equal to 3 in the present example.

When flip-flop 5 passes to "1" state, a request for commutation onto the emergency channel is established. It is then necessary to wait for the quality of the link to return to a satisfactory level to effect the reverse commutation. In practice, it is preferable to provide more severe quality criteria for the commutation in this direction, so as to avoid too frequent commutations. In the example given, commutation will be triggered only when $n_2$ counting periods of duration $t_2$ have lapsed without register 4 having received a pulse SA, $n_2$ being greater than $n_1$ and chosen to be equal to 8 in this example.

However, it might also be provided to give N a value higher than that indicated for commutation onto the emergency channel.

The value $t_1$ is chosen to be equal to 2 milliseconds to avoid transients being able to trigger off a commutation. The value of 100 milliseconds chosen for $t_2$ pertains to a 34 Mbits/s transmission. For a fixed field, the minimum error density which triggers off commutation is 5 errors/100 ms, or about $1.5.10^{-6}$.

An embodiment of the apparatus of FIG. 1 will now be described in detailed manner with reference to FIG. 2, in which the various components are shown incorporated in blocks so as to bring out correspondance with FIG. 1.

Terminal ER is connected to the input of a 4-bit binary counter 10 of which stages A,B,C have outputs connected to a NAND gate 11, via an inverter 12 in the case of stage B. Hence, gate 11 of which the output is normally a "1" produces a negative pulse SA once 5 errors have been detected. The output of gate 11 is connected to the enable input P of counter 10, so that counting stops when 5 errors have been detected.

The time base 2 of the apparatus includes a pulse generator 20 at 10 Hz, an inverter 21 connected to the output of generator 20, a D-type flip-flop 22 with a clock input connected to the inverter and a Q output looped onto S input (SET), and a monostable 23 having its input connected to the output of flip-flop 22 and which determines a period of 2 milliseconds. Flip-flop 22 derives due to the above-mentioned loop pulses $T_2$ of very short duration at a frequency of 10 Hz, thus every 100 milliseconds, and monostable 23 derives at its Q output square waveforms $T_1$ of duration 2 milliseconds of which the descending edges are triggered by pulses $T_2$.

Logic circuit 3 incorporates a first D-type flip-flop 30 having its clock input connected to the output of monostable 23 and its D input connected to NAND gate 11, with the Q output looped onto S input. The Q output is connected to an input of a NAND gate 31 which produces via an inverter 32 pulses for resetting counter 10, pulse generator 20 and monostable 23.

A second D-type flip-flop 33 has its clock input connected to the NAND gate 11 via an inverter 34. Flip-flop 33 has its Q output connected to the input of a NAND gate 35 the output of which is the output RT of circuit 3. The Q output of flip-flop 33 is connected to an input of a NAND gate 36 the other input of which is connected to the output of monostable 23 and the output of which is connected to an input of NAND gate 31.

Logic circuit 3 further comprises a D-type flip-flop 37 having its D input connected to inverter 34 and the clock input of which receives the pulses derived from flip-flop 22. The Q output of flip-flop 37 is connected to the other input of NAND gate 35. Moreover, both flip-flop 35 and 37 have their Q outputs connected to their S inputs like flip-flops 22 and 30.

The output of NAND gate 35 is connected to the clock input of a 8-bit shift register 40 receiving pulses SA from gate 11.

The outputs A,B,C of register 40 are connected via respective inverters 41, 42, 43 to a NAND gate 44 having its output connected to the S input of the D-type flip-flop 5. Furthermore, all of the 8 outputs of register 40 are connected to a NAND gate 45 the output of which is connected to the reset input of flip-flop 5. The Q output of flip-flop 5 is connected to the commutation device mentioned above.

The operation of this device will now be described in the three possibles cases described above.

In the third case, a pulse $T_2$ is derived after 100 milliseconds before generation of a pulse SA. The output of gate 11 is thus a 1.

Flip-flop 30 remains in state 1 as its state is not changed by the rising edge of the output of monostable 23.

The output of inverter 34 is a 0 and the output of flip-flop 33 is also a 1. In contrast, flip-flop 37 having its D input in low state and its clock input connected to flip-flop 22 changes state into a 0 as it receives the pulse corresponding to the 100 milliseconds period being lapsed, then immediately returns to 1 due to the above-described loop. The negative pulse thus derived is passed through NAND gate 35 the other input of which is a 1.

This pulse is applied to the clock input of register 40 and triggers writing of a 1 in register 40, which appears at output A.

NAND gate 31 has its inputs connected to flip-flops 30 and 33 (via gate 36) in state 1. Hence, production of pulse $T_2$ by flip-flop 22 causes a positive pulse to be derived at the output of gate 31, which is inverted by inverted 32. The resultant negative pulse resets counter 10, generator 20 and monostable 23.

Assuming now that 5 errors have been detected within the time interval of 2 milliseconds, a pulse SA is produced before generation of a pulse $T_1$ by monostable 23.

The D input of flip-flop 30 changes then into a 0. The rising trailing edge of pulse $T_1$ from monostable 23 causes flip-flop 30 to change state and return to high state. Flip-flop 30 thus delivers a negative pulse which is applied to NAND gate 31.

The output of inverter 34 changes into a 1 and flip-flop 33 therefore delivers a pulse at the time of deriving pulse SA, and not at the end of the period of 2 milliseconds like flip-flop 30.

Flip-flop 37 remains in high state as its clock input only receives a pulse after 100 milliseconds, i.e. pulse $T_2$.

Hence, the pulse produced by flip-flop 33 is passed through NAND gate 35 and causes a 0 to be entered in register 40.

Resetting of the apparatus only takes place after time interval $t_1$ is lapsed, because gate 31 only receives a pulse from flip-flop 30 when monostable 23 has generated a pulse $T_1$.

Let it be assumed finally that a pulse SA is derived after a time interval between 2 and 100 milliseconds.

When pulse SA is produced, flip-flop 30 does not change state as it receives no pulse from monostable 23. Flip-flop 33 delivers a pulse since a rising edge is applied to its clock input.

Flip-flop remains in high state as its clock input is a 1. The pulse derived from flip-flop 33 is thus passed through gate 35 and triggers entering of a 0 in register 40.

Resetting of the apparatus occurs immediately. Namely, the output of flip-flop 30 remains a 1, like that of flip-flop 22, as the time interval $t_2$ is not completed. In contrast, gate 36 derives a positive pulse since the output of monostable 23 remains a 1 and flip-flop 33 delivers a positive pulse. The positive pulse derived from gate 36 is passed through gate 31 while being inverted, and after inversion by inverter 32, it effects resetting of the apparatus.

The commutation demand is produced by flip-flop 5 when all of the outputs A,B,C of register 40 are 0's, which involves storing of three pulses SA within three consecutive counting periods.

Resetting of flip-flop 5 takes place when all of the outputs of register 40 are 1's, which corresponds to 8 consecutive counting periods without a pulse SA being produced.

What I claim is:

1. A method of counting transmission errors in a digital microwave link for producing a demand of commutation onto an emergency channel when the quality of the link becomes deficient, wherein the errors are counted during a period t which is always at least equal to a value $t_1$ and at most equal to a value $t_2$, and which period terminates when a fixed number N of errors has been detected, a pulse is stored upon each detection of N errors within a period t, and a demand of commutation is produced when $n_1$ pulses have been stored consecutively.

2. A method as claimed in claim 1, wherein, once a demand for commutation has been produced, the reverse commutation is triggered off only when, for $n_2$ consecutive periods, $n_2$ being greater than $n_1$, no detection of said number N of errors has been made.

3. An apparatus for counting transmission errors in a digital microwave link, and for producing a demand of commutation onto an emergency channel when the quality of the link becomes deficient, comprising an error counter producing an error signal SA after detection of N errors, a time base operable to deliver pulses $T_2$ with a period of $t_2$ and signals $T_1$ of duration $t_1 < t_2$ triggered by said pulses, a register connected to the counter and having an enable input, means for generating a commutation demand when said register has stored $n_1$ consecutive error signals, and a logic circuit comprising first flip-flop means connected to said error counter and clocked by said signals $T_1$ and having its output connected to said error counter and said time base for resetting thereof, second flip-flop means having its clock input connected to the error counter, a first output Q connected to the enable input of the register while a second inverted output Q is connected to the time base and the error counter for resetting thereof, and third flip-flop means clocked by said pulses $T_2$ and connected to said error counter and having its output connected to the enable input of the register.

* * * * *